United States Patent [19]

Ogoda

[11] Patent Number: 4,997,178
[45] Date of Patent: Mar. 5, 1991

[54] METHOD OF AND MECHANISM FOR FEEDING SHEET

[75] Inventor: Makoto Ogoda, Kanagawa, Japan

[73] Assignee: Fuji Photo Film Co., Ltd., Kanagawa, Japan

[21] Appl. No.: 331,480

[22] Filed: Mar. 31, 1989

[30] Foreign Application Priority Data

Apr. 1, 1988 [JP] Japan .................................. 63-81778
Apr. 1, 1988 [JP] Japan .................................. 63-81779

[51] Int. Cl.$^5$ ............................................ B65H 5/22
[52] U.S. Cl. .................................... 271/276; 271/197
[58] Field of Search ........................ 271/196, 196, 276

[56] References Cited

U.S. PATENT DOCUMENTS 4,745,283  5/1988  Katsuda ........................... 271/197 X
4,776,577 10/1988  Marschke ......................... 271/197 X
4,792,249 12/1988  Lahr ................................ 271/197 X Primary Examiner—Richard A. Schacher
Attorney, Agent, or Firm—Sughrue, Mion, Zinn, Macpeak & Seas

[57] ABSTRACT

A sheet such as a stimulable phosphor sheet or a photographic film is fed in an auxiliary scanning direction by a sheet feed mechanism while the sheet is being scanned by a one-dimensionally deflected light beam along a main scanning line in a main scanning direction substantially perpendicular to the auxiliary scanning direction. The feed mechanism has an auxiliary scanning feed belt having a plurality of holes, a first suction chamber positioned upstream of the main scanning line with respect to the auxiliary scanning direction, a second suction chamber positioned downstream of the main scanning line with respect to the auxiliary scanning direction, and first and second valve bodies communicating with the first and second suction chambers, respectively. The sheet is attracted to the feed belt under an attractive force developed by only the first suction chamber while the sheet is being fed in the auxiliary scanning direction. Then, the attractive force developed by the first suction chamber is reduced, and an attractive force developed by the second suction chamber is increased. When the sheet is further progressively fed in the auxiliary scanning direction, the sheet is attracted to the feed belt under the attractive force developed by only the second suction chamber while sheet is being fed in the auxiliary scanning direction.

7 Claims, 11 Drawing Sheets

(a)

(c)

METHOD OF AND MECHANISM FOR FEEDING SHEET

BACKGROUND OF THE INVENTION

The present invention relates to a method of and a mechanism for feeding a sheet, and more particularly to a method of and a mechanism for feeding a sheet such as a stimulable phosphor sheet, a film, or the like with image information recorded thereon by attracting the sheet, the film, or the like to a feed belt with at least two vacuum chambers to smoothly move the sheet, the film, or the like in an auxiliary scanning direction while the sheet, the film, or the like is being scanned by a one-dimensionally deflected light beam in a main scanning direction substantially normal to the auxiliary scanning direction, so that the image information can accurately be read and/or recorded.

There has recently been known a radiation image information recording and reproducing system for producing the radiation-transmitted image of an object using a stimulable phosphor material capable of emitting light upon exposure to stimulating rays When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The radiation image recorded on the stimulable phosphor sheet is read in the radiation image recording and reproducing system as follows:

The radiation image recording and reproducing system includes an image reader for two-dimensionally scanning the stimulable phosphor sheet with a light beam such as a laser beam to cause the stimulable phosphor sheet to emit light, and detecting the light in time series with a light detector such as a photomultiplier to obtain image information. The stimulable phosphor sheet is usually two-dimensionally scanned by deflecting the light beam and applying the deflected light beam to the stimulable phosphor sheet in a main scanning direction, and simultaneously feeding the stimulable phosphor sheet mechanically on a conveyor belt or the like in an auxiliary scanning direction substantially normal to the main scanning direction.

The image information thus retrieved is then sent to an image reproducer. In the image reproducer, a laser beam which has been modulated by the image information retrieved from the stimulable phosphor sheet is applied to a photographic photosensitive member such as a photosensitive film to reproduce the image on the film. When the modulated laser beam is applied to the film, the film is mechanically fed in an auxiliary scanning direction by a feed belt.

Where the stimulable phosphor sheet is to be fed in the auxiliary scanning direction by the feed belt, then it is necessary that the stimulable phosphor sheet be fed at a constant speed and kept flatwise. If the stimulable phosphor sheet were not fed at a constant speed, then the image recorded on the stimulable phosphor sheet would not accurately be read. If a portion of the stimulable phosphor sheet were spaced from the feed belt and no longer kept flatwise, the recorded image would be read as a distorted image. Therefore, it would be impossible to accurately read the image information borne by the stimulable phosphor sheet.

One conventional arrangement for feeding a stimulable phosphor sheet in an auxiliary scanning direction at a constant speed and flatwise employs a suction box connected to a feed belt and a vacuum suction source, The feed belt is an endless belt having a plurality of holes with the suction box disposed in the feed belt. When the vacuum suction source is operated, the suction box draws the stimulable phosphor sheet to the feed belt under a vacuum to keep the stimulable phosphor sheet flat and feed the same without displacement from the feed belt.

The suction box generally has a plurality of suction chambers arrayed in the direction in which the stimulable phosphor sheet is fed, to prevent air from leaking from the entire suction box. When the stimulable phosphor sheet is fed, the suction chambers are successively evacuated one at a time as the stimulable phosphor sheet is moved along. Therefore, the stimulable phosphor sheet is held intimately against the feed belt by at least one of the suction chambers at all times.

When the suction chambers are successively evacuated, however, the stimulable phosphor sheet may be fed at an irregular speed upon switching from one suction chamber to another suction chamber. For example, when the leading end of the stimulable phosphor sheet drawn by the first suction chamber and fed by the feed belt reaches the second suction chamber, the second suction chamber is evacuated to attract the stimulable phosphor sheet. At this time, the load imposed on the stimulable phosphor sheet as it is fed along is abruptly increased, thereby varying the interval by which the stimulable phosphor sheet is fed. When the first suction chamber is disabled after the stimulable phosphor sheet is attracted by the second suction chamber, the load on the stimulable phosphor sheet as it is fed is abruptly reduced, also varying the interval by which the stimulable phosphor sheet is fed. If the stimulable phosphor sheet is subjected to such fluctuations in the feed rate or interval, then the image information recorded on the stimulable phosphor sheet would not be read precisely, and could no longer be used for medical diagnosis or other applications which demand the high-fidelity reproduction of the recorded image.

The applicant has proposed a small-size image reading and reproducing system comprising an image reader and an image reproducer which share a common scanning system for effecting both an image reading process and an image reproducing process (see Japanese Patent Application No. 62-265012, for example). In the proposed image reading and reproducing system, an image is reproduced on a photosensitive film while the latter is being attracted by a suction box and fed by a feed belt in the same manner as when a recorded image is read from a stimulable phosphor sheet. However, a special problem arises out of the fact that the film used is considerably thinner than the stimulable phosphor sheet. When the film is attracted by first and second adjacent suction chambers of the suction box, a portion of the film on the partition between the first and second suction chambers is not attracted by the suction box. Therefore, the film has alternate attracted and unattracted portions, which make the thin film wavy in shape on the feed belt. As a consequence, the desired degree of flatness of the entire film can no longer be ensured When this happens, scanning lines on the film tend to be distorted, thus failing to reproduce the image highly accurately.

SUMMARY OF THE INVENTION

It is a primary object of the present invention to provide a method of and a mechanism for feeding a sheet such as a stimulable phosphor sheet, a film, or the like on which image information is recorded, with a feed belt while the sheet is attracted by two suction chambers that are divided from each other along a main scanning line and juxtaposed in an auxiliary scanning line normal to the main scanning line, the first and second suction chambers applying a constant attractive force at all times to the sheet as it is moved from the first suction chamber to the second suction chamber for allowing an image to be read and/or recorded highly accurately, and the first and second suction chambers being separated from each other by a partition which has a predetermined gap to prevent the sheet from being deformed into a wavy configuration.

Another object of the present invention is to provide a method of feeding a sheet in an auxiliary scanning direction with a sheet feed mechanism while the sheet is being scanned by a one-dimensionally deflected light beam along a main scanning line in a main scanning direction substantially perpendicular to said auxiliary scanning direction, said feed mechanism having an auxiliary scanning feed belt having a plurality of holes, a first suction chamber positioned upstream of said main scanning line with respect to the auxiliary scanning direction, a second suction chamber positioned downstream of said main scanning line with respect to the auxiliary scanning direction, and first and second valve bodies communicating with said first and second suction chambers, respectively, said method comprising the steps of: operating said first and second valve bodies in ganged relation to attract the sheet to said feed belt under an attractive force developed by only said first suction chamber while the sheet is being fed in the auxiliary scanning direction; operating said first and second valve bodies in ganged relation when the sheet is progressively fed in the auxiliary scanning direction, to reduce the attractive force developed by said first suction chamber and increase an attractive force developed by said second suction chamber; and operating said first and second valve bodies in ganged relation when the sheet is further progressively fed in the auxiliary scanning direction, to attract the sheet to said feed belt under the attractive force developed by only said second suction chamber while the sheet is being fed in the auxiliary scanning direction.

Still another object of the present invention is to provide a mechanism for feeding a sheet in an auxiliary scanning direction while the sheet is being scanned by a one-dimensionally deflected light beam along a main scanning line in a main scanning direction substantially perpendicular to said auxiliary scanning direction, said mechanism comprising: an auxiliary scanning feed belt for feeding the sheet in the auxiliary scanning direction, said auxiliary scanning feed belt having a plurality of holes; a first suction chamber positioned upstream of said main scanning line with respect to the auxiliary scanning direction for attracting the sheet to the auxiliary scanning feed belt under suction; a second suction chamber positioned downstream of said main scanning line with respect to the auxiliary scanning direction for attracting the sheet to the auxiliary scanning feed belt under suction; switching means for switching the sheet attracting action progressively from said first suction chamber to said second suction chamber as the sheet is progressively fed in the auxiliary scanning direction; and said switching means having first and second suction passages communicating respectively with said first and second suction chambers, first and second valve bodies operable in ganged relation to control fluid communication between said first and second suction passages and said first and second suction chambers, and a drive source for operating said first and second valve bodies in unison to vary the amount of suction through said first and second suction passages.

Yet another object of the present invention is to provide a sheet feed mechanism wherein said first and second valve bodies are substantially cylindrical in shape and have first and second through holes, respectively, for fluid communication with said first and second suction passages, respectively, said first and second valves being rotatable in unison by said drive source to control fluid communication between said first and second suction passages and said first and second suction chambers through said first and second through holes, respectively.

Yet still another object of the present invention is to provide a sheet feed mechanism wherein said switching means further includes first and second intermeshing gears mounted respectively on said first and second valve bodies, and rotatable by said drive source to rotate said first and second valve bodies in unison.

A further object of the present invention is to provide a sheet feed mechanism wherein said first chamber comprises a plurality of suction chambers juxtaposed in said main scanning direction and said second chamber comprises a plurality of suction chambers juxtaposed in said main scanning direction, said first suction passage comprising a plurality of suction passages communicating respectively with the first suction chambers, said second suction passage comprising a plurality of suction passages communicating respectively with the second suction chambers, said first valve body comprising a plurality of valve bodies for controlling fluid communication between the first suction passages and the first suction chambers, and said second second valve body comprising a plurality of valve bodies for controlling fluid communication between the second suction passages and the second suction chambers.

A still further object of the present invention is to provide a mechanism for feeding a sheet in an auxiliary scanning direction while the sheet is being scanned by a one-dimensionally deflected light beam along a main scanning line in a main scanning direction substantially perpendicular to said auxiliary scanning direction, said mechanism comprising: a feed belt for feeding the sheet in the auxiliary scanning direction, said feed belt having a plurality of holes; and a suction box disposed below said feed belt and having a first suction chamber positioned upstream of said main scanning line with respect to the auxiliary scanning direction and having a plurality of slots defined in a surface facing said feed belt, a second suction chamber positioned downstream of said main scanning line with respect to the auxiliary scanning direction and having a plurality of slots defined in a surface facing said feed belt, and a plurality of grooves by which the slots of said first suction chamber and the slots of said second suction chamber communicate with each other on a surface facing said feed belt.

A yet further object of the present invention is to provide a sheet feed mechanism wherein said slots are elongated in said auxiliary scanning direction, said suction box having a partition separating said first and second suction chambers from each other, said grooves being defined in said partition.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
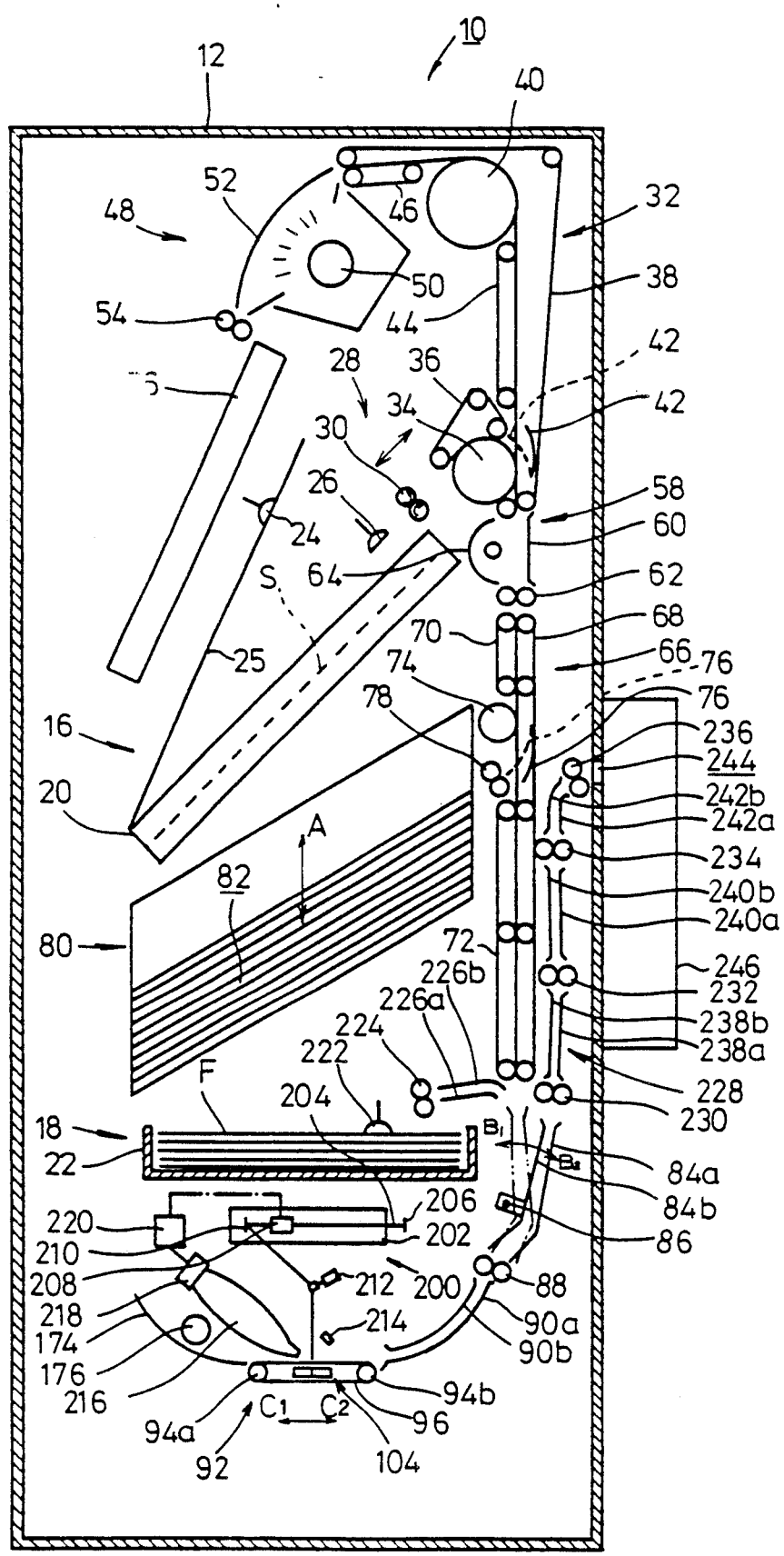
FIG. 1 is a schematic elevational view of an image reading and reproducing system incorporating a sheet feeding mechanism for carrying out a sheet feeding method according to the present invention.

FIG. 1 shows an image reading and reproducing system, generally designated by the reference numeral 10, which incorporates therein a sheet feed mechanism for carrying out a sheet feeding method according to the present invention. The image reading and reproducing system 10 including a vertically elongated housing 12 having a first loading unit 16 and a second loading unit 18. A stimulable phosphor sheet S contained in a cassette 20 or a stack of stimulable phosphor sheets S contained in a sheet magazine (not shown) is detachably loaded in the first loading unit 16, whereas a stack of photosensitive films F contained in a film magazine 22 is detachably loaded in the second loading unit 18.

The first loading unit 16 includes a lid opening mechanism having a suction cup 24 connected to a vacuum suction device (not shown) for attracting a lid 25 of the cassette 20 and opening the lid 25. The first loading unit 16 also includes a sheet delivery mechanism including a suction cup 26 positioned on one side of the cassette 20 for removing a stimulable phosphor sheet S from the cassette 20 with its lid 25 open. A stimulable phosphor sheet S which has been removed from the cassette 20 by the suction cup 26 is delivered along a predetermined path, and then supplied to a first feed means 28. The first feed means 28 comprises a pair of rollers 30 which are displaceable toward the suction cup 26 as indicated by one of the arrowheads for gripping the stimulable phosphor sheet S, and also displaceable away from the suction cup 26 as indicated by the other arrowhead for supplying the stimulable phosphor sheet S toward a second feed means 32.

The second feed means 32 comprises a larger-diameter drum 34, a first feed belt 36 held in contact with the drum 34, and a second feed belt 38 held in contact with the drum 34. The first feed belt 36 is trained around three rollers and has a portion held against the drum 34. The second feed belt 38 extends vertically upwardly out of contact with the drum 34, and is bent substantially perpendicularly so as to extend substantially horizontally along an inner surface of an upper panel of the housing 12. The second feed belt 38 remains bent around a larger-diameter roller 40. A first switching guide member 42 is disposed in an area where the second feed belt 38 and the drum 34 are held against each other. A third feed belt 44 is held against a vertical run of the second feed belt 38, and a fourth feed belt 46 is disposed underneath and in contact with a horizontal run of the second feed belt 38.

An eraser unit 48 is positioned in the vicinity of the distal end of the fourth feed belt 46. The eraser unit 48 comprises an erasing light source 50 such as a sodium-vapor lamp, a tungsten lamp, or a xenon lamp, a guide panel 52 for guiding the stimulable phosphor sheet S, and a roller pair 54 disposed beneath the guide panel 52. A tray 56 is positioned below the roller pair 54. When a sheet magazine storing a plurality of stimulable phosphor sheets S is loaded in the first loading unit 16, the tray 56 stores the stimulable phosphor sheets S after recorded images have been read from the stimulable phosphor sheets S fed from the sheet magazine and residual image information has been erased from the stimulable phosphor sheets S by the eraser unit 48.

A third feed means 58 comprises a guide panel 60 disposed below the second feed means 32, and a roller pair 62 is located near the lower end of the guide panel 60. An auxiliary eraser unit 64 is provided near the third feed means 58.

A fourth feed means 66 is disposed downwardly of the roller pair 62. The fourth feed means 66 comprises a relatively long fifth feed belt 68 extending vertically downwardly, a relatively short sixth feed belt 70 held in contact with an upper portion of the fifth feed belt 68, and a seventh feed belt 72 held against a lower portion of the fifth feed belt 68 A roller 74 of a relatively large diameter is held in rolling contact with an intermediate portion of the fifth feed belt 68 A second switching guide member 76 is positioned near the roller 74 The second switching guide member 76 can be angularly displaced into a broken-line position to position its tip end near a roller pair 78. A stimulable phosphor sheet S which has been fed by the fourth feed means 66 can be introduced into a stacker 80 by the roller pair 78.

The stacker 80 is movable vertically in the directions of the arrow A by a motor or the like (not shown). The stacker 80 can store a stimulable phosphor sheet S fed by the roller pair 78 into a desired one of an array of juxtaposed sheet bins 82. The stimulable phosphor sheet S stored in the stacker 80 is then fed to the fourth feed means 66 by the roller pair 78 and the second switching guide member 76.

A pair of movable guide plates 84a, 84b is disposed in slightly spaced relation to the fifth and seventh feed belts 68, 72 of the fourth feed means 66. The movable guide plates 84a, 84b are swingable in union about a pivot 84 comprising a pin. The lower ends of the movable guide plates 84a, 84b are positioned in confronting relation to a roller pair 88 that is positioned above a pair of curved guide plates 90a, 90b. The guide plates 90a, 90b serve to guide a stimulable phosphor sheet S and a film F toward a sheet feed mechanism 92.

Figure 2:
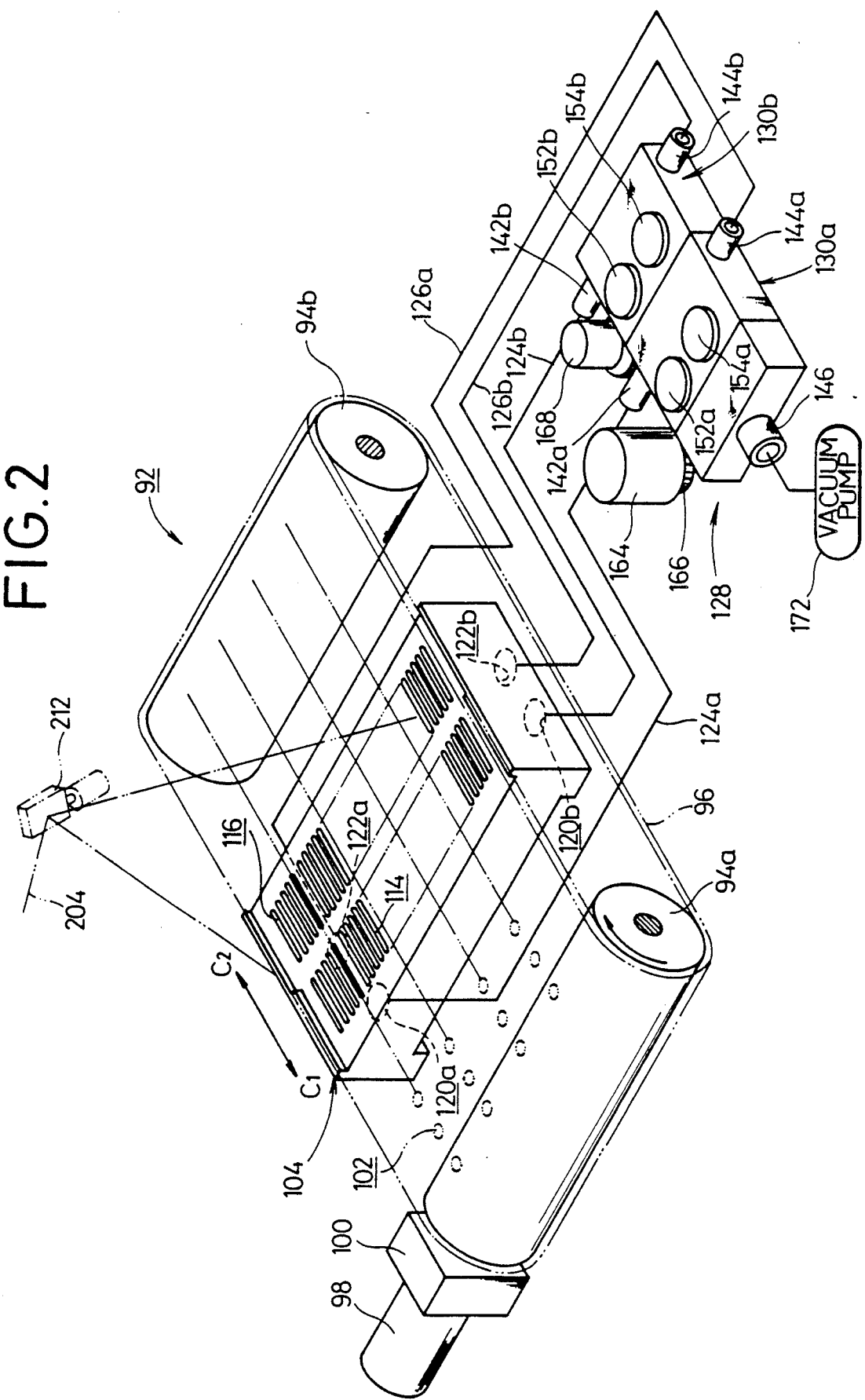
FIG. 2 is a perspective view of a sheet feed mechanism according to a first embodiment of the present invention.

As shown in FIG. 2, the sheet feed mechanism 92 includes a pair of parallel rollers 94a, 94b spaced from each other, and an endless, auxiliary scanning feed belt 96 trained around the rollers 94a, 94b. A motor 98 is coupled to the roller 94a through a speed reducer 100. The auxiliary scanning feed belt 96 has a plurality of holes 102 defined therein.

The sheet feed mechanism 92 serves to feed a stimulable phosphor sheet S or a film F in an auxiliary scanning direction indicated by the arrow $C_2$ while the stimulable phosphor sheet S or the film F is being scanned by a laser beam (described later on) in a main scanning direction (directed horizontally in FIG. 3) normal to the auxiliary scanning direction.

Figure 3:
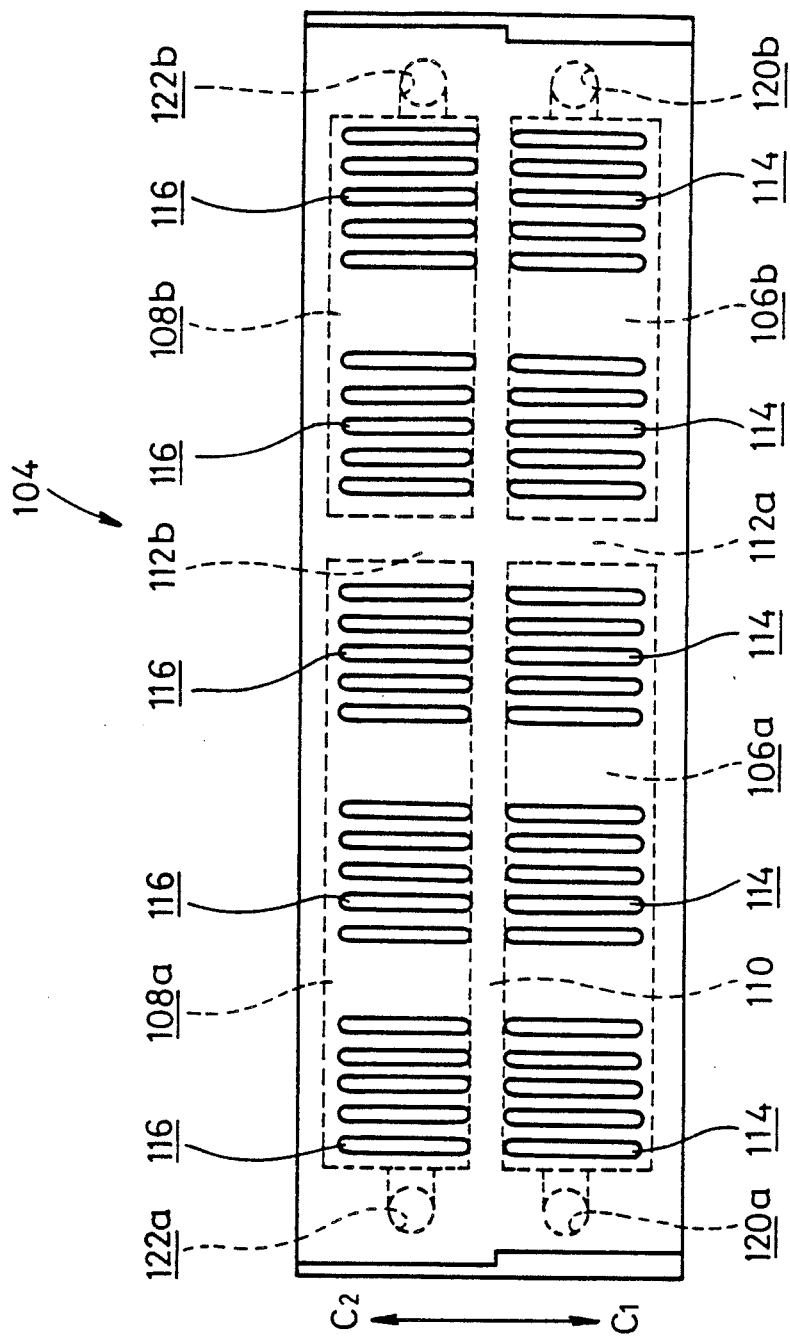
FIG. 3 is a plan view of a suction box of the sheet feed mechanism shown in FIG. 2.

The sheet feed mechanism 92 includes a suction box 104 disposed between the upper and lower runs of the feed belt 96 and also between the rollers 94a, 94b. As shown in FIG. 3, the suction box 104 has a pair of chambers 106a, 106b positioned upstream of a main scanning line (extending along the main scanning direction across the suction box 104) with respect to the auxiliary scanning direction, and a pair of chambers 108a, 108b positioned downstream of the main scanning line with respect to the auxiliary scanning line. The chambers 106a, 106b are juxtaposed in the main scanning direction, and the chambers 108a, 108b are also juxtaposed in the main scanning direction. The chambers 106a, 106b and the chambers 108a, 108b are separated from each other by a partition 110. The chambers 106a, 106b are separated from each other by a partition 112a, and the chambers 108a, 108b are separated from each other by a partition 112b. The suction box 104 has two arrays of slots 114 defined in its upper panel for providing fluid communication between the interior spaces of the chambers 106a, 106b and the exterior space, and also two arrays of slots 116 defined in its upper panel for providing fluid communication between the interior spaces of the chambers 108a, 108b and the exterior space, the slots 114, 116 being elongated in the directions in which a sheet is fed by sheet feed mechanism 92.

Passages 120a, 120b, 122a, 122b have ends communicating with the chambers 106a, 106b, 108a, 108b, respectively, and opposite ends connected to a switching means 128 through tubes 124a, 124b, 126a, 126b, respectively, which are indicated as solid lines in FIG. 2.

Figure 4:
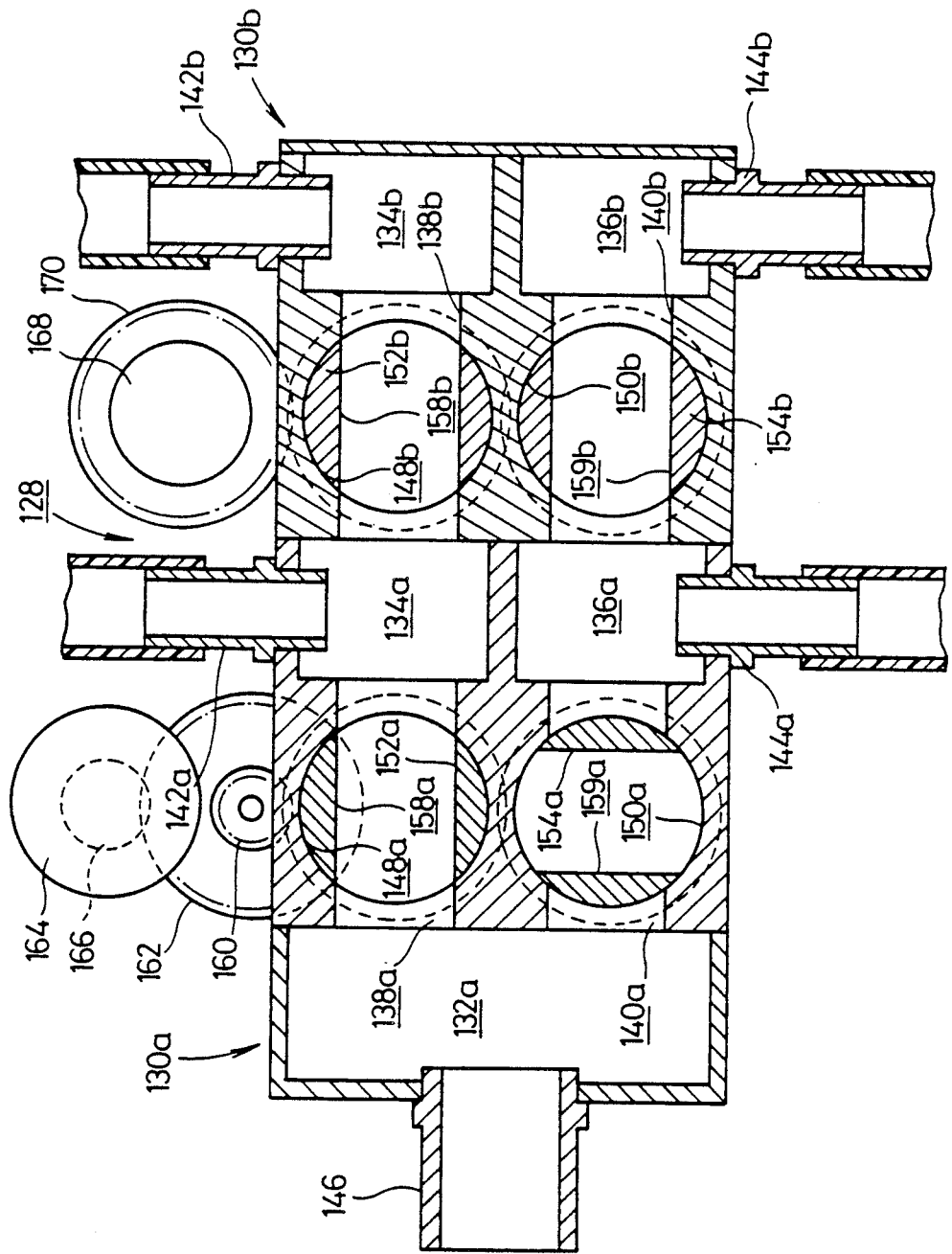
FIG. 4 is a fragmentary plan view of a switching means of the sheet feed mechanism illustrated in FIG. 2.
Figure 5:
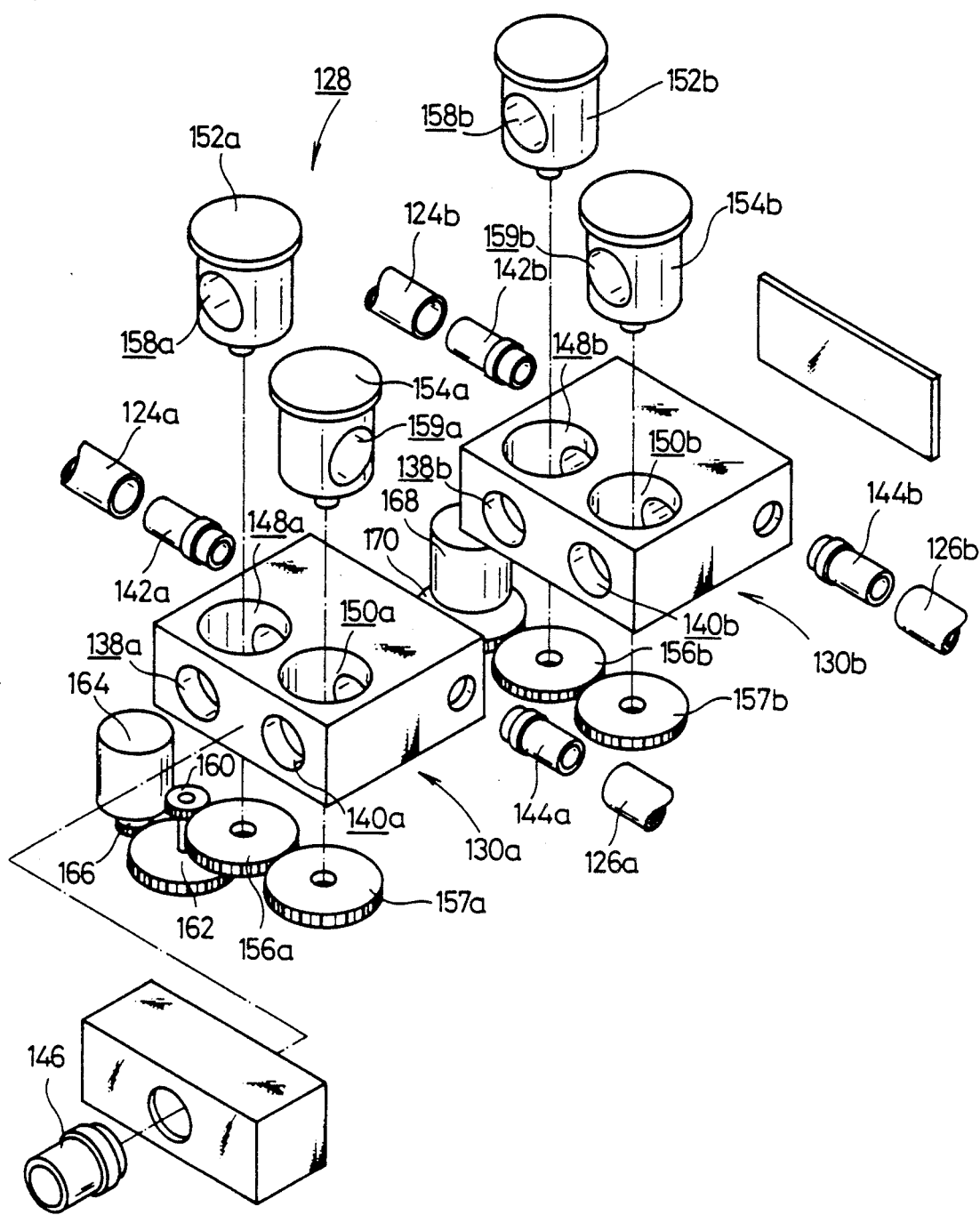
FIG. 5 is an exploded perspective view of the switching means shown in FIG. 4.

As illustrated in FIGS. 4 and 5, the switching means 128 includes a first switching box 130a and a second switching box 130b. The first switching box 130a defines chambers 132a, 134a, 136a therein. The chamber 132a is held in communication with the chamber 134a through a passage 138a and also with the chamber 136a through a passage 140a. The first switching box 130a has a side wall defining the chamber 134a and having a hole in which a pipe joint 142a is fitted, and a side wall defining the chamber 136a and having a hole in which a pipe joint 144a is fitted. A pipe joint 146 is also fitted in a hole defined in a side wall of the first switching box 130 which defines the chamber 132a.

The first switching box 130a has large-diameter holes 148a, 150a defined therein substantially perpendicularly to the passages 138a, 140a, respectively, and substantially cylindrical valve bodies 152a, 154a are rotatably fitted in the holes 148a, 150a, respectively. The valve bodies 152a, 154a have respective gears 156a, 157a mounted on their lower ends, and also have respective through holes 158a, 159a defined therein perpendicularly to their axes and having the same diameter as that of the passages 138a, 140a.

The gear 156a of the valve body 152a and the gear 157a of the valve body 154a are held in mesh with each other, and a small-diameter gear 160 meshes with the gear 156a. The small-diameter gear 160 is connected to a coaxial large-diameter gear 162 held in mesh with a gear 166 directly coupled to the rotatable drive shaft of a motor 164. The hole 158a in the valve body 152a has its axis perpendicular to the axis of the hole 159a in the valve body 154a.

The second switching box 130b has chambers 134b, 136b defined therein. The chamber 134b communicates with the chamber 134a through a passage 138b, and the chamber 136b communicates with the chamber 136a through a passage 140b. The second switching box 130b has a side wall defining the chamber 134b and having a hole in which a pipe joint 142b is fitted, and a side wall defining the chamber 136b and having a hole in which a pipe joint 144b is fitted.

The second switching box 130b has large-diameter holes 148b, 150b defined therein substantially perpendicularly to the passages 138b, 140b, respectively, and substantially cylindrical valve bodies 152b, 154b are rotatably fitted in the holes 148b, 150b, respectively The valve bodies 152b, 154b have respective gears 156b, 157b mounted on their lower ends, and also have respective through holes 158b, 159b defined therein perpendicularly to their axes and having the same diameter as that of the passages 138b, 140b. The gear 156b of the valve body 152b and the gear 157b of the valve body 154b are held in mesh with each other, and the gear 156b of the valve body 152b meshes with a gear 170 mounted on the rotatable drive shaft of a motor 168.

The tubes 124a, 126a are fitted respectively over the pipe joints 142a, 144a, and the tubes 124b, 126b are fitted respectively over the pipe joints 142b, 144b. The pipe joint 146 is connected through a tube to a vacuum pump 172 (see FIG. 2).

The auxiliary scanning feed belt 96 of the sheet feed mechanism 92 thus constructed serves to feed the stimulable phosphor sheet S or the film F supplied from the guide plates 90a, 90b toward a guide plate 174, and to thereafter feed it in the opposite direction for auxiliary scanning. A roller 176 is positioned near the guide plate 174 for preventing the stimulable phosphor sheet S or the film F from rising off the guide plate 174 due to flexing of the stimulable phosphor sheet S or the film F.

An image reading and recording mechanism 200 is positioned above the sheet feed mechanism 92 for reading image information recorded on the stimulable phosphor sheet S and exposing the film F to the image information thus read. The image reading and recording mechanism 200 includes a laser beam source 202 and a mirror 206 disposed on the laser beam emitting side of the laser beam source 202 for reflecting a laser beam 204 emitted from the laser beam source 202. The laser beam 204 reflected by the mirror 206 passes through a light modulator 208 toward another mirror 210. The light modulator 208 is energized only when an image is to be recorded on the film F, and not energized when an image is read from the stimulable phosphor sheet S. The image reading and recording mechanism 200 also includes a gavanometer mirror 212 and a light-collecting reflecting mirror 214 for scanning the stimulable phosphor sheet S with the laser beam 204 which has been reflected by the mirror 210.

A light guide 216 which extends along a main scanning line is positioned in the area where the stimulable phosphor sheet S is scanned by the laser beam 204, and a photomultiplier 218 is mounted on an upper end of the light guide 216. The photomultiplier 218 is electrically connected to an image information processing circuit 220. Therefore, an electric signal produced by the photomultiplier 218 is sent to the image information processing circuit 220 for image processing, and a processed image is stored in a memory means or the like. The stimulable phosphor sheet S from which the image has been read by the image reading and recording mechanism 200 is then delivered to the eraser unit 48 through the fourth feed means 66, the third feed means 58, and the second feed means 32.

The second loading unit 18 stores the detachable magazine 22 which contains a stack of films F, as described above. A film delivery mechanism including a suction cup 222 is positioned near a film access opening of the magazine 22. The suction cup 222 serves to deliver one film F at a time from within the magazine 22 and supply the film F to a roller pair 224. A pair of guide plates 226a, 226b is positioned in confronting relation to and slightly spaced from the roller pair 224. The guide plates 226a, 226b have ends facing the movable guide plates 84a, 84b. When the roller pair 224 operates, the film F supplied to the roller pair 224 is transferred through the guide plates 226a, 226 b into a position between the movable guide plates 84a, 84b. The film F is then fed in the auxiliary scanning direction indicated by the arrow $C_2$ in substantially the same manner as the stimulable phosphor sheet S. While the film F is being fed in the auxiliary scanning direction, the laser beam 204 is modulated by the light modulator 208 based on the image information read from the stimulable phosphor sheet S, and the film F is exposed to the modulated laser beam 204. The film F to which the image information has been exposed is then fed toward the roller pair 88, after which the film F is guided by the movable guide pates 84a, 84b into a film feed means 228 extending parallel to the fourth feed means 66.

The film feed means 228 includes roller pairs 230, 232, 234, 236 spaced at intervals, a pair of guide plates 238a, 238b disposed between the roller pairs 230, 232, a pair of guide plates 240a, 240b disposed between the roller pairs 232, 234, and a pair of curved guide plates 242a, 242b disposed between the roller pairs 234, 236. The roller pair 236 is positioned near an opening 244 defined in a side panel of the housing 12 of the image reading and reproducing system 10. The film F with an image reproduced thereon which is fed by the film feed means 228 is sent through the opening 244 into a receiver magazine 246 detachably mounted on the housing 12.

The sheet feed mechanism for carrying out a sheet feeding method according to the present invention, and the image reading and reproducing system incorporating the sheet feed mechanism are basically constructed as described above. Now, the sheet feed mechanism and the image reading and reproducing system will operate and offers advantages as follows:

The cassette 20 storing a stimulable phosphor sheet S or the sheet magazine (not shown) storing a stack of stimulable phosphor sheets S is loaded into the first loading unit 16 in the image reading and reproducing system 10. In the illustrated embodiment, the cassette 20 is loaded into the first loading unit 16. The lid 25 of the cassette 20 is opened by the suction cup 24 of the lid opening mechanism under a vacuum applied thereby.

Then, the stimulable phosphor sheet S in the cassette 20 is picked up and removed from the cassette 20 by the suction cup 26, and at the same time the roller pair 30 of the first feed means 28 is displaced toward the suction cup 26, while the rollers of the roller pair 30 are being rotated in the directions indicated by the arrows. The stimulable phosphor sheet S is gripped by the roller pair 30, which is then displaced toward the first feed belt 36 of the second feed means 32 to supply the stimulable phosphor sheet S to the second feed means 32. In the second feed means 32, the stimulable phosphor sheet S is gripped between the drum 34 and the first feed belt 36, and thereafter gripped between the drum 34 and the second feed belt 38 so as to be fed into the third feed means 58. The stimulable phosphor sheet S is then fed from the roller pair 62 of the third feed means 66 into a position between the fifth feed belt 68 and the sixth feed belt 70 of the fourth feed means 66.

At this time, the second switching guide member 76 is angularly displaced toward the broken-line position in FIG. 1, and the stimulable phosphor sheet S is stored into a desired sheet bin 82 in the stacker 80 by the roller pair 78.

Then, the stacker 80 is elevated or lowered as indicated by the arrow A to select a stimulable phosphor sheet S with other image information recorded thereon, stored in the stacker 80. The selected stimulable phosphor sheet S is delivered through the roller pair 78 into the fourth feed means 66 by which the stimulable phosphor sheet S is then fed downwardly. The movable guide plates 84a, 84b have been turned about the pivot 86 in the direction indicated by the arrows $B_1$ by means of a drive source (not shown). Thus, the stimulable phosphor sheet S is supplied into a gap defined between the movable guide plates 84a, 84b.

The stimulable phosphor sheet S supplied between the movable guide plates 84a, 84b is then gripped by the roller pair 88, which is actuated to feed the stimulable phosphor sheet S into the sheet feed mechanism 92 along the guide plates 90a, 90b. In the sheet feed mechanism 92, the stimulable phosphor sheet S is fed in the direction indicated by the arrow $C_1$ by the auxiliary scanning feed belt 96 until it is placed onto the guide plate 174. More specifically, the motor 98 of the sheet feed mechanism 92 is energized and its drive force is transmitted through the speed reducer 100 to the roller 94a. The roller 94a is rotated in the direction opposite to the direction indicated by the arrow to rotate the auxiliary scanning feed belt 96 trained around the rollers 94a, 94b, thereby feeding the stimulable phosphor sheet S in the direction indicated by the arrow $C_1$. When the trailing end of the stimulable phosphor sheet S has moved past the scanning area in the image reading and recording mechanism 200, the motor 94 is reversed to rotate the roller 94a in the direction indicated by the arrow. The auxiliary scanning feed belt 96 is therefore rotated in the opposite direction to displace the stimulable phosphor sheet S in the auxiliary scanning direction indicated by the arrow $C_2$.

Figure 6:
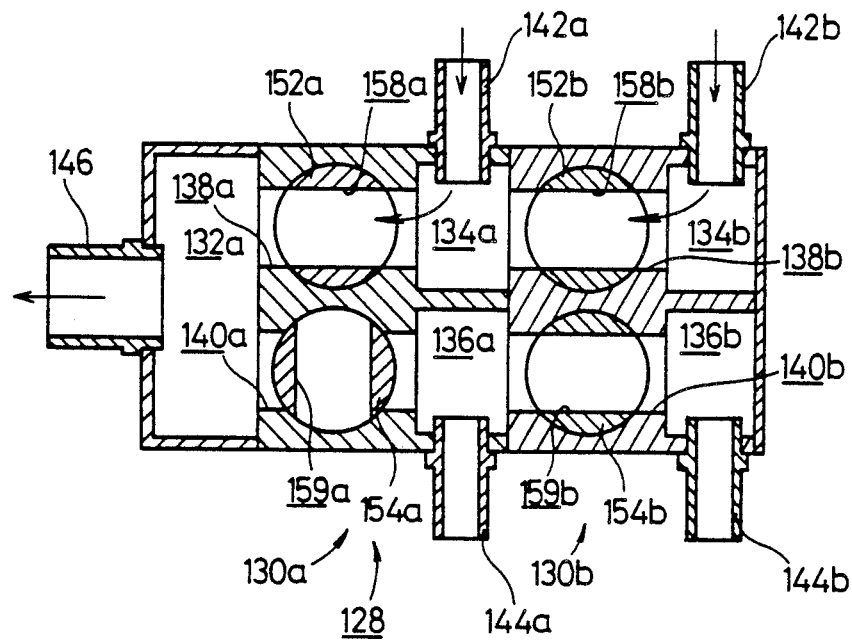
FIGS. 6(a), 6(b), and 6(c) are cross-sectional views showing the manner in which fluid passages in the switching means of FIGS. 4 and 5 are opened and closed.
Figure 6:
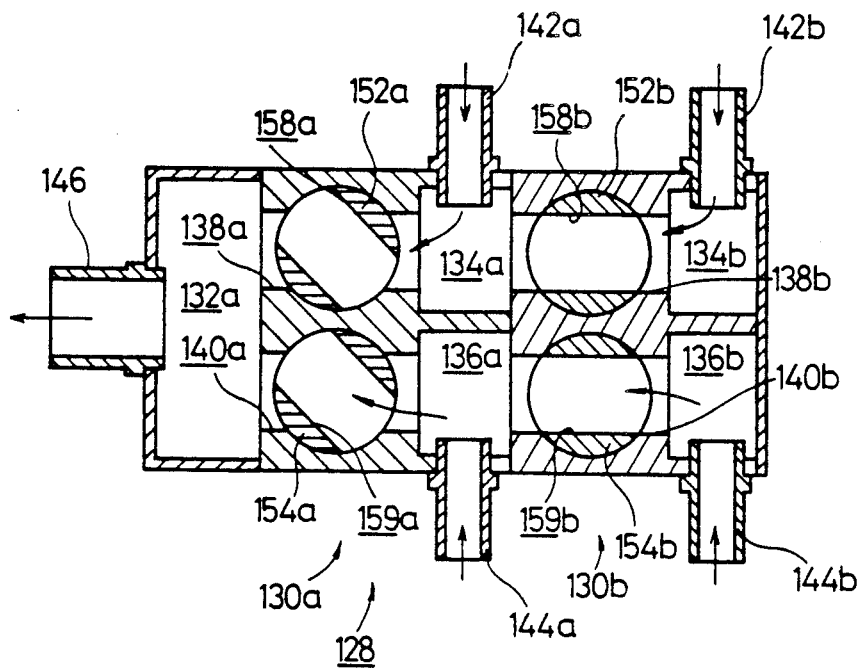
Figure 6:
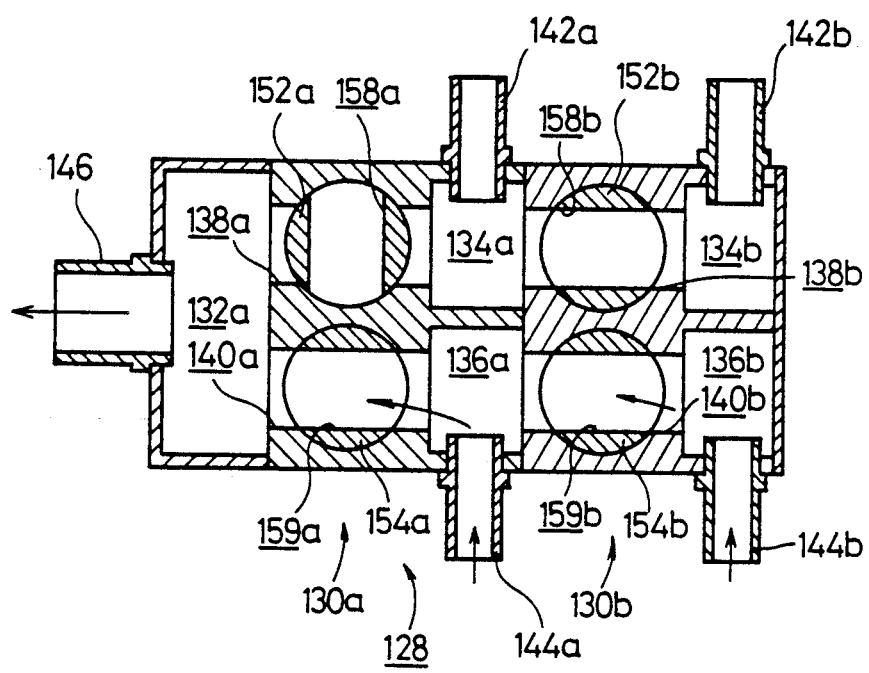
Figure 7:
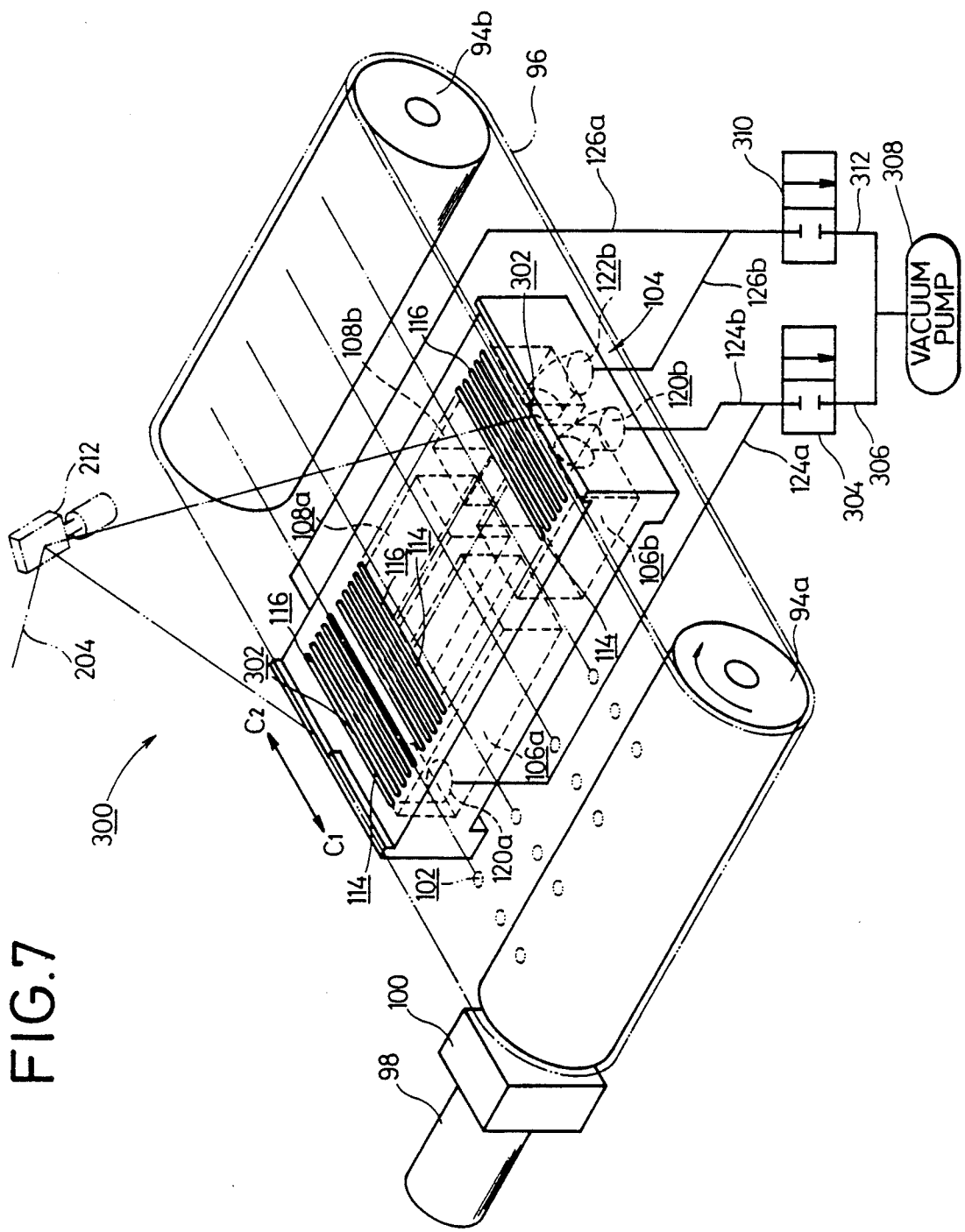
FIG. 7 is a perspective view of a sheet feed mechanism according to a second embodiment of the present invention.
Figure 8:
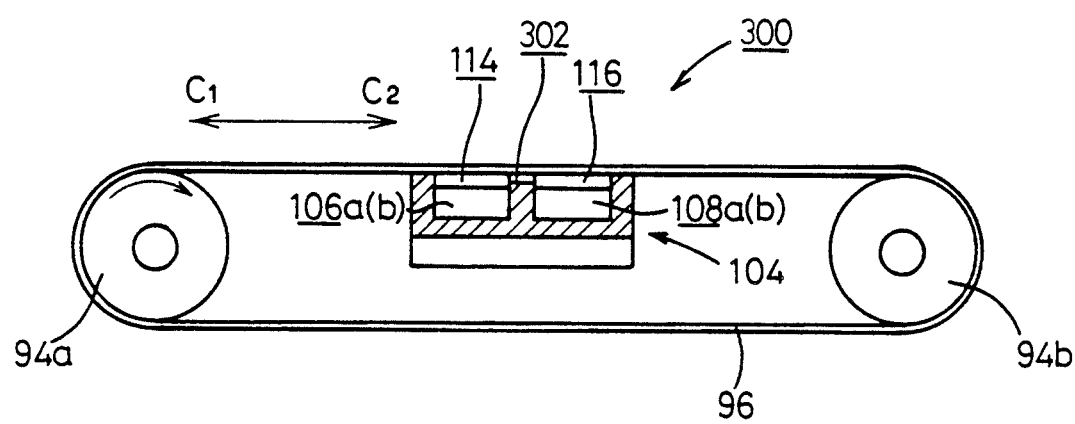
FIG. 8 is a side elevational view, partly in cross section, of a portion of the sheet feed mechanism of FIG. 7.
Figure 9:
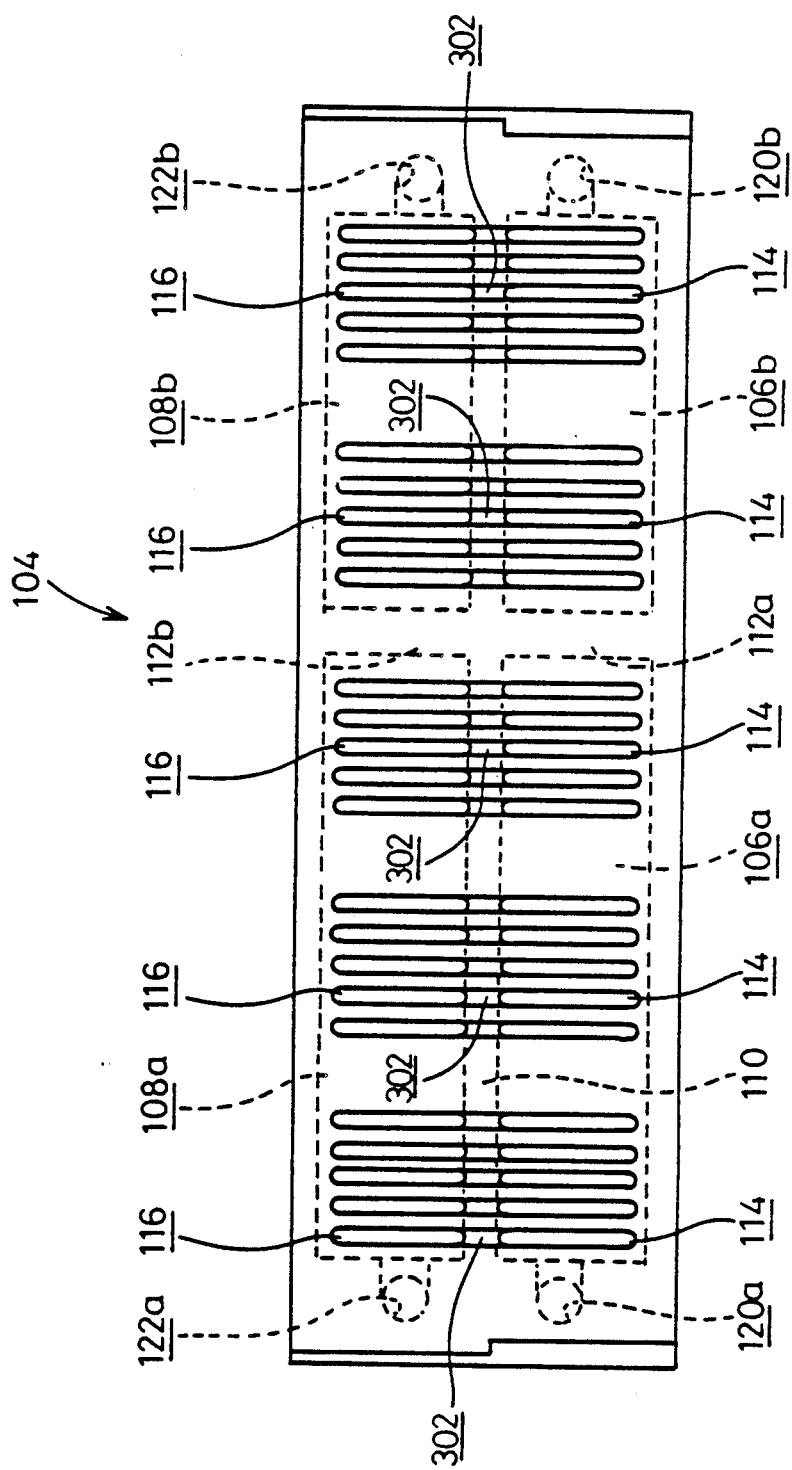
FIG. 9 is a plan view of a suction box of the sheet feed mechanism shown in FIGS. 7 and 8.
Figure 10:
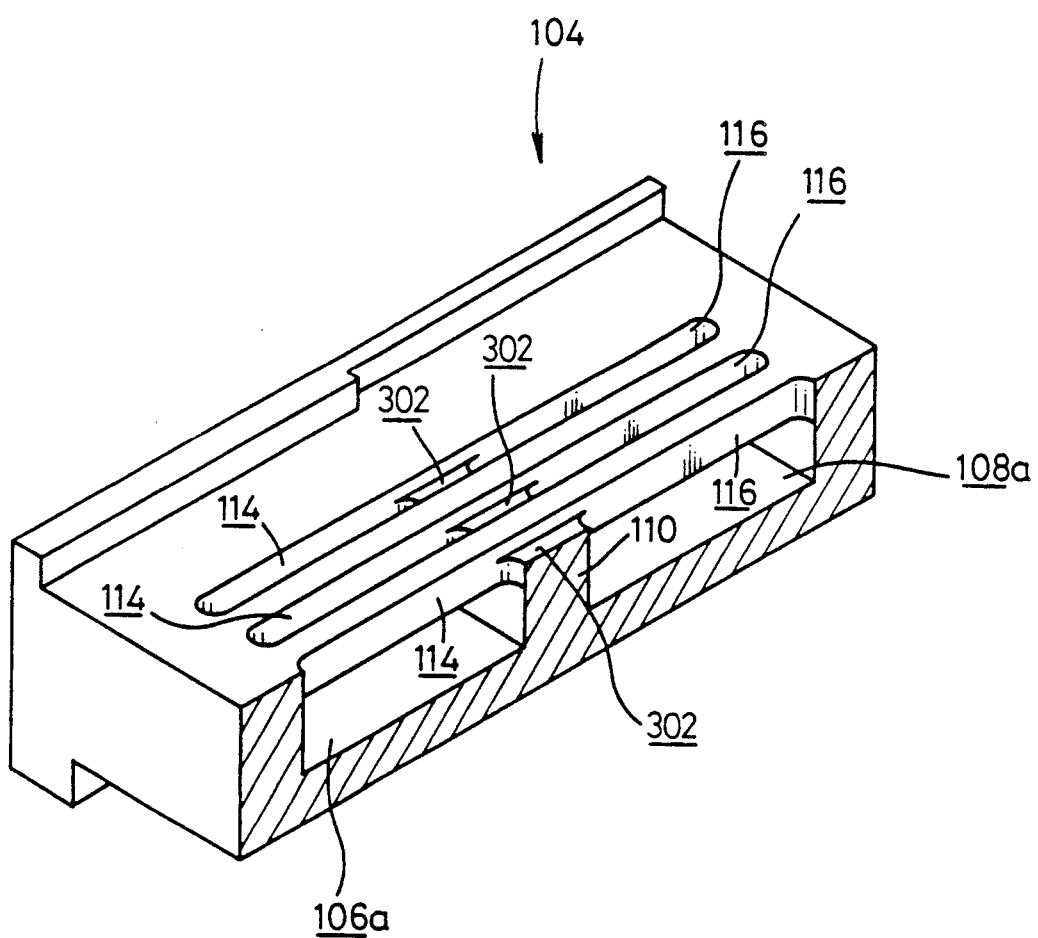
FIG. 10 is a fragmentary perspective view of the suction box illustrated in FIG. 9.

The vacuum pump 172 is then operated, and the motor 164 of the switching means 128 is energized to bring the hole 158a in the valve body 152a into alignment with the passage 138a. At the same time, the passage 140a is closed off by the valve body 154a (see FIG. 4 and FIG. 6(a)). More specifically, when the motor 164 is energized, the gear 166 mounted on the drive shaft of the motor 164 is rotated. The rotative force of the gear 166 is transmitted through the gears 162, 160 to the gears 156a, 157a to rotate the valve bodies 152a, 152a in their respective directions. At this time, the valve bodies 152b, 154b in the second switching box 130b are rotated by the motor 168 through the gears 170, 156a, 157a to bring the holes 158b, 159b into registry with the respective passages 138b, 140b. As a result, upon operation of the vacuum pump 172, air is drawn from the chambers 106a, 106b through the chambers 134a, 134b. Therefore, the stimulable phosphor sheet S is attracted to the auxiliary feed belt 96 under a vacuum developed in the chambers 106a, 106b, and is delivered in the direction indicated by the arrow $C_2$.

The motor 164 is energized again to cause the gears 166, 162, 160, 156a to rotate the valve body 152a in a prescribed direction, and also to cause the gear 157a meshing with the gear 156a to rotate the valve body 154a in a prescribed direction. As the valve bodies 152a, 154a are thus rotated, the hole 158a and the passage 138a are brought out of full registry with each other, and the hole 159a and the passage 140a are brought into partial communication with each other (see FIG. 6(b)). The amount of air drawn from the chambers 106a, 106b is reduced to lower the attractive force developed by the chambers 106a, 106b. Air in the chambers 108a, 108b is introduced through the tubes 126a, 126b into the chamber 136a in the first switching box 130a and the chamber 136b in the second switching box 130b, and then through the passages 140a, 140b into the passage 146. The stimulable phosphor sheet S is now attracted to the feed belt 96 under substantially the same attractive force as when the stimulable phosphor sheet S was attracted by the chambers 106a, 106b connected to the vacuum pump 172. Therefore, the stimulable phosphor sheet S is attracted by the chambers 106a, 106b and the chambers 108a, 108b without undesirable fluctuations or variations in the attractive force, and fed in the auxiliary scanning direction.

The motor 164 is further energized to angularly displace the holes 158a, 159a in the valve bodies 152a, 154a for reducing the attractive force developed by the chambers 106a, 106b and increasing the attractive force developed by the chambers 108a, 108b. The passage 138a is finally closed off by the valve body 152a, whereas the hole 159a in the valve body 154a is brought into full registry with the passage 140a, whereupon the stimulable phosphor sheet S is attracted by the attractive force which is developed only by the chambers 108a, 108b (see FIG. 6(c)). At this time, the stimulable phosphor sheet S is subjected to substantially the same attractive force as when it was attracted jointly by the chambers 106a, 106b and the chambers 108a, 108b. The stimulable phosphor sheet S thus remains attracted to the feed belt 96 under substantially the same attractive force even when the sheet attracting action is progressively switched from the chambers 106a, 106b to the chambers 108a, 108b as the stimulable phosphor sheet S is delivered by the auxiliary scanning belt 96. Where the stimulable phosphor sheet S is of a reduced width, the motor 168 is energized to rotate the gear 170 in a prescribed direction to cause the gear 156b meshing with the gear 170 and the gear 157b meshing with the gear 156b to rotate the valve bodies 152b, 154b until they close off the respective passages 138b, 140b. When the passages 138b, 140b are closed off by the respective valve bodies 152b, 154b, air is no longer drawn out of the chambers 106b, 108b by the vacuum pump 172, and hence the stimulable phosphor sheet S is not attracted by the chambers 106a, 108b.

While the stimulable phosphor sheet S is being fed as indicated by the arrow $C_2$, the image reading and recording mechanism 200 is energized to enable the laser beam source 202 to emit the laser beam 204. The laser beam 204 is reflected by the mirrors 206, 210 toward the galvanometer mirror 212, which is periodically swung back and forth to deflect and scan the laser beam 204 over the stimulable phosphor sheet S in the main scanning direction. At this time, the light modulator 208 is not energized since it is used for recording an image. Light emitted from the stimulable phosphor sheet S upon exposure to the laser beam 204 is applied directly or via the reflecting mirror 214 to the light guide 216. The photomultiplier 218 then converts the light from the light guide 216 into an electric signal that is supplied to the image information processing circuit 220. The stimulable phosphor sheet S is thus two-dimensionally scanned by the laser beam 204.

After the image has been read, the stimulable phosphor sheet S is delivered by the roller pair 88 along the guide plates 90a, 90b into the position between the movable guide plates 84a, 84b. The movable guide plates 84a, 84b have been angularly displaced to in the direction indicated by the arrow $B_1$. Therefore, the stimulable phosphor sheet S is guided by the movable guide plates 84a, 84b into the position between the fifth feed belt 68 and the seventh feed belt 72 of the fourth feed means 66, by which the stimulable phosphor sheet S is delivered upwardly.

The stimulable phosphor sheet S is further fed upwardly by the third feed means 58 and the second feed means 32, and then directed substantially horizontally into the eraser unit 48. In the eraser unit 48, light emitted from the erasing light source 50 erases any residual image information on the stimulable phosphor sheet S.

The stimulable phosphor sheet S from which residual image information has been eliminated by the eraser unit 48 is fed downwardly again by the second feed means 32 into the third feed means 58. The second switching guide member 76 of the fourth feed means 66 is turned to the broken-line position. The stimulable phosphor sheet S is then guided into the selected sheet bin 82 in the stacker 80 through the second switching guide member 76 and the roller pair 78.

The cassette 20 from which the stimulable phosphor sheet S has been removed is then supplied with a stimulable phosphor sheet S with image information erased therefrom which has been stored in a sheet bin 82 in the stacker 80. More specifically, the stacker 80 is displaced in the direction indicated by the arrow A to position the stimulable phosphor sheet S with image information erased therefrom into alignment with the roller pair 78. Then, the stimulable phosphor sheet S is gripped by the roller pair 78 upon displacement to the right, and then fed thereby toward the fourth feed means 66. The stimulable phosphor sheet S fed to the fourth feed means 66 is delivered upwardly into the third feed means 58.

Any remaining image information which may have been left on the stimulable phosphor sheet S is completely removed by the auxiliary eraser unit 64, after which the stimulable phosphor sheet S is fed into the second feed means 32. At this time, the first switching guide member 42 of the second feed means 32 has been angularly displaced to the broken-line position. Therefore, the stimulable phosphor sheet S is guided by the first switching guide member 42 to travel along the first feed belt 36, and then gripped by the roller pair 30 of the first feed means 28. Then, the roller pair 30 is displaced toward the cassette 20, and the rollers thereof are rotated in the directions opposite to those indicated by the arrows to store the stimulable phosphor sheet S into the cassette 20.

When the stimulable phosphor sheet S is fed from the sheet feed mechanism 92 into the fourth feed means 66 through the roller pair 88, the film delivery mechanism disposed near the second loading unit 18 is operated to enable the suction cup 222 to pick up and remove the uppermost one of stacked films F in the magazine 22. The film F removed by the suction cup 222 is gripped by the roller pair 224, which is then rotated to feed the film F into the position between the movable guide plates 84a, 84b through the guide plates 226a, 226b. The film F is gripped and fed by the roller pair 88 along the guide plates 90a, 90b in the same manner as the stimulable phosphor sheet S was fed, as described above, into the sheet feed mechanism 92. The film F fed into the sheet feed mechanism 92 is delivered by the auxiliary scanning feed belt 92 in the direction of the arrow $C_1$ onto the guide plate 174. Thereafter, the film F is fed in the opposite direction indicated by the arrow $C_2$ by reversing the direction of movement of the auxiliary scanning feed belt 96. During this time, the film F is attracted to the auxiliary scanning feed belt 96 under a vacuum developed by the chambers 106a, 106b of the suction box 104. As the film F is progressively displaced, the attractive force produced by the chambers 106a, 106b is reduced, and the attractive force applied by the chambers 108a, 108b is complementarily increased. Therefore, the film F is fed in the direction indicated by the arrow $C_2$ while it is being attracted under a vacuum developed by the chambers 108a, 108b.

When the film F is fed in the direction indicated by the arrow $C_2$, the image reading and recording mechanism 200 is energized again. More specifically, the laser beam 204 is emitted from the laser beam source 202 and reflected by the mirror 206 to reach the light modulator 208. The light modulator 208 is supplied with image signal data from the stimulable phosphor sheet S which have been processed by the image information processing circuit 220 and stored in a memory means (not shown). Therefore, the laser beam 204 which has reached the light modulator 20 has been modulated by the image signal data. The modulated laser beam 204 is reflected by the mirror 210 to reach the galvanometer mirror 212, which is swung back and forth to deflect the laser beam 204 in the main scanning direction while applying the laser beam 204 to the film F. While the film F is being fed in the auxiliary scanning direction, it is scanned by the laser beam 204 in the main scanning direction. Therefore, the film F is two-dimensionally exposed to the image which has been read from the stimulable phosphor sheet S. While the film F is being exposed to the image, the photomultiplier 218 is de-energized.

After being exposed to the image, the film F is fed from the sheet feed mechanism 92 into the position between the movable guide plates 84a, 84b through the guide plates 90a, 90b and the roller pair 88. The movable guide plates 84a, 84b are turned in the direction indicated by the arrow $B_2$ to allow the film F to be gripped by the roller pair 230 of the film feed means 228. The film F gripped by the roller pair 230 is then fed upwardly by rotation of the roller pair 230, and delivered continuously upwardly by the roller pairs 232, 234. Subsequently, the film F is guided along a curved path by the guide plates 242a, 242b and fed by the roller pair 236 through the opening 244 into the receiver magazine 246. After a predetermined number of films F have been stored in the receiver magazine 246, the receiver magazine 246 is removed from the housing 12 in a light-shielded condition, and then the films F are loaded into an image developing device (not shown) to develop the images on the films F.

In the aforesaid embodiment, the stimulable phosphor sheet S and the film F are fed in the auxiliary scanning direction by the auxiliary scanning feed belt 96 of the sheet feed mechanism 92, and at the same time are attracted to the auxiliary scanning feed belt 96 under the vacuum developed by the chambers 106a, 106b and 108a, 108b in the suction box 104. As the stimulable phosphor sheet S is thus fed in the auxiliary scanning direction, the sheet attracting action of the suction box 104 is progressively switched from the chambers 106a, 106b to the chambers 108a, 108b by progressively reducing the attractive force developed by the chambers 106a, 106b and progressively increasing the attractive force developed by the chambers 108a, 108b, so that the total attractive force produced by the suction box 104 remains constant at all times during its operation. More specifically, when the stimulable phosphor sheet S or the film F is fed in the auxiliary scanning direction indicated by the arrow $C_2$ by the auxiliary scanning feed belt 96, the motor 164 of the switching means 128 is energized and its driving force is transmitted to the valve bodies 152a, 154a to rotate them in their respective directions. The valve bodies 152a, 154a are angularly positioned such that the holes 158a, 159a defined in the valve bodies 152a, 154a are oriented at different angles. Accordingly, upon rotation of the valve bodies 152a, 154a, the area through which the hole 158a and the passage 138a in the first switching box 130a communicate with each other is progressively reduced, and the area through which the hole 159a and the passage 140a in the second switching box 130b is progressively increased. The attractive force developed by the chamber 106a which communicates with the passage 138a through the chamber 134a and the tube 124a is progressively lowered, and the attractive force developed by the chamber 108a which communicates with the passage 140a through the chamber 136a and the tube 126a is progressively increased. Consequently, switching from the sheet attracting action of the chambers 106a, 106b to the sheet attracting action of the chambers 108a, 108b can smoothly be carried out. The total attractive force acting on the stimulable phosphor sheet S or the film F as it is fed by the auxiliary scanning feed belt 96 is maintained at a substantially constant level, and no feed rate fluctuations or variations are caused upon switching from the chambers 106a, 106b to the chambers 108a, 108b. Therefore, the stimulable phosphor sheet S or the film F can smoothly be fed in the auxiliary scanning direction for accurately reading an image from the stimulable phosphor sheet S or accurately reproducing an image on the film F.

A sheet feed mechanism according to a second embodiment of the present invention will be described below. Those components of the sheet feed mechanism of the second embodiment which are identical to those of the sheet feed mechanism 92 are denoted by identical reference numerals, and will not be described in detail.

As shown in FIGS. 7 through 10, a sheet feed mechanism 300 according to the second embodiment includes a suction box 104 having chambers 106a, 106b communicating with the exterior space through a plurality of slots 114 and chambers 108a, 108b communicating with the exterior space through a plurality of slots 116, the slots 114, 116 being held in communication with each other through shallow grooves or recesses 302 defined in an upper surface of a partition 110 which separates the chambers 106a, 106b from the chambers 108a, 108b.

Passages 120a, 120b are connected through respective tubes 124a, 124b to a first switching or shutoff valve 304 coupled to a vacuum pump 308 through a tube 306. Passages 122a, 122b are connected through respective tubes 126a, 126b to a second switching or shutoff valve 310 coupled to the vacuum pump 308 through a tube 312. The first and second switching valves 304, 310 may be replaced with the switching means 128 of the first embodiment.

A film F is fed by the sheet feed mechanism 300 as follows The film F placed on the auxiliary scanning feed belt 96 is first fed in the direction indicated by the arrow $C_1$ by the auxiliary scanning feed belt 96, and then fed in the auxiliary scanning direction indicated by the arrow $C_2$ by reversing the direction of movement of the auxiliary scanning feed belt 96. When the film F is fed in the auxiliary scanning direction, the vacuum pump 308 is actuated, and the first switching valve 304 is operated to bring the tubes 124a, 124b into communication with the tube 306. Air in the chambers 106a, 106b in the suction box 104 is drawn to the vacuum pump 308 through the tubes 124a, 124b, the first switching valve 304, and the tube 306. Therefore, the film F, while being fed in the auxiliary scanning direction of the arrow $C_2$, is attracted to the auxiliary scanning feed belt 96 under a vacuum applied through the slots 114 in the suction box 104 and the holes 102 in the auxiliary scanning feed belt 96.

Then, the first switching valve 304 is operated to disconnect the tubes 124a, 124b from the tube 306, and the second switching valve 310 is operated to bring the tubes 126a, 126b into communication with the tube 312. Air in the chambers 108a, 108b in the suction box 104 is drawn to the vacuum pump 308 to attract the film F through the slots 116 and the holes 102.

While the film F is being thus fed in the auxiliary scanning direction of the arrow $C_2$, the image reading and recording mechanism 200 is energized to expose the film F to a scanning laser beam bearing image information to be reproduced.

Since the film F is considerably thin, it tends to be deformed or get wavy in the position between the chambers 106a, 106b and the chambers 108a, 108b. According to the second embodiment, however, since the recesses 302 providing a gap are defined in the upper surface of the partition 110 by which the chambers 106a, 106b and the chambers 108a, 108b are separated from each other, the film F is attracted to the auxiliary scanning feed belt 96 under a vacuum applied by the chambers 106a, 106b or the chambers 108a, 108b through the slots 114 or 116 and also through the recesses 302. Thus, the film F is attracted substantially fully along the main scanning line, and remains flat on the auxiliary scanning feed belt 96.

According to a feature of the present invention, as described above, when a sheet such as a stimulable phosphor sheet with desired image information recorded thereon is fed by the endless auxiliary scanning feed belt in the auxiliary scanning direction substantially normal to the main scanning direction, the sheet is attracted to the auxiliary scanning feed belt under a constant attractive force created under a vacuum developed by the two sets of chambers positioned upstream and downstream, respectively, of the main scanning line with respect to the auxiliary scanning line, the chambers being smoothly switched in operation to produce the constant attractive force. Therefore, the sheet is not subjected to undesirable feed rate irregularities or fluctuations which would otherwise be caused upon switching between the chambers, and hence can be fed smoothly. As a consequence, an image can be read from or recorded on the sheet with high accuracy.

According to another feature of the present invention, the two sets of chambers defined in the suction box upstream and downstream, respectively, of the main scanning line with respect to the auxiliary scanning direction are held in communication with each other through shallow grooves or recesses defined in the upper surface of the partition separating the two sets of chambers from each other. When a relatively thin sheet such as a photographic photosensitive film is fed by the auxiliary scanning feed belt in the auxiliary scanning direction, the sheet can be attracted to the auxiliary scanning feed belt on the main scanning line under a vacuum applied through the recesses. The sheet is therefore prevented from being deformed into a wavy shape, but remains flat on the auxiliary scanning feed belt to allow a desired image to be reproduced on the sheet highly accurately.

Where the sheet feed mechanism of the invention is incorporated in the image reading and reproducing system, the stimulable phosphor sheet and the film can be fed in the auxiliary scanning direction by the single sheet feed mechanism. The image reading and reproducing system can thus be manufactured economically and in a small size.

Although certain preferred embodiments have been shown and described, it should be understood that many changes and modifications may be made therein without departing from the scope of the appended claims.

What is claimed is:

1. A method of feeding a sheet in an auxiliary scanning direction with a sheet feed mechanism while the sheet is being scanned by a one-dimensionally deflected light beam along a main scanning line in a main scanning direction substantially perpendicular to said auxiliary scanning direction, said feed mechanism having an auxiliary scanning feed belt having a plurality of holes, a first suction chamber positioned upstream of said main scanning line with respect to the auxiliary scanning direction, a second suction chamber positioned downstream of said main scanning line with respect to the auxiliary scanning direction, and first and second valve bodies operatively connected to each other through a mechanical linkage and communicating with said first and second suction chambers, respectively, said method comprising the steps of:

operating said first and second valve bodies through said mechanical linkage in ganged relation to attract the sheet to said feed belt under an attractive force developed by only said first suction chamber while the sheet is being fed in the auxiliary scanning direction;

operating said first and second valve bodies through said mechanical linkage in ganged relation when the sheet is progressively fed in the auxiliary scanning direction, to reduce the attractive force developed by said first suction chamber and increase an attractive force developed by said second suction chamber;

operating said first and second valve bodies through said mechanical linkage in ganged relation when the sheet is further progressively fed in the auxiliary scanning direction, to attract the sheet to said feed belt under the attractive force developed by only said second suction chamber while the sheet is being fed in the auxiliary scanning direction.

2. A mechanism for feeding a sheet in an auxiliary scanning direction while the sheet is being scanned by a one-dimensionally deflected light beam along a main scanning line in a main scanning direction substantially perpendicular to said auxiliary scanning direction, said mechanism comprising:

an auxiliary scanning feed belt for feeding the sheet in the auxiliary scanning direction, said auxiliary scanning feed belt having a plurality of holes;

a first suction chamber positioned upstream of said main scanning line with respect to the auxiliary scanning direction for attracting the sheet to the auxiliary scanning feed belt under suction;

a second suction chamber positioned downstream of said main scanning line with respect to the auxiliary scanning direction for attracting the sheet to the auxiliary scanning feed belt under suction;

switching means for switching the sheet attracting action progressively from said first suction chamber to said second suction chamber as the sheet is progressively fed in the auxiliary scanning direction;

said switching means having first and second suction passages communicating respectively with said first and second suction chambers, first and second valve bodies operatively connected to each other through a mechanical linkage in ganged relation to control fluid communication between said first and second suction passages and said first and second suction chambers, and a drive source for operating said first and second valve bodies through said mechanical linkage such that said first and second valve bodies are driven in unison to vary the amount of suction through said first and second suction passages.

3. A mechanism according to claim 2, wherein said first and second valve bodies are substantially cylindrical in shape and have first and second through holes, respectively, for fluid communication with said first and second suction passages, respectively, said first and second valves being rotatable in unison by said drive source to control fluid communication between said first and second suction passages and said first and second suction chambers through said first and second through holes, respectively.

4. A mechanism according to claim 2, wherein said switching means further includes first and second intermeshing gears mounted respectively on said first and second valve bodies, and rotatable by said drive source to rotate said first and second valve bodies in unison.

5. A mechanism according to claim 2, wherein said first chamber comprises a plurality of suction chambers juxtaposed in said main scanning direction and said second chamber comprises a plurality of suction chambers juxtaposed in said main scanning direction, said first suction passage comprising a plurality of suction passages communicating respectively with the first suction chambers, said second suction passage comprising a plurality of suction passages communicating respectively with the second suction chambers, said first valve body comprising a plurality of valve bodies for controlling fluid communication between the first suction passages and the first suction chambers, and said second second valve body comprising a plurality of valve bodies for controlling fluid communication between the second suction passages and the second suction chambers.

6. A mechanism for feeding a sheet in an auxiliary scanning direction while the sheet is being scanned by a one-dimensionally deflected light beam along a main scanning line in a main scanning direction substantially perpendicular to said auxiliary scanning direction, said mechanism comprising:

a feed belt for feeding the sheet in the auxiliary scanning direction, said feed belt having a plurality of holes; and a suction box disposed below said feed belt and having a first suction chamber positioned upstream of said main scanning line with respect to the auxiliary scanning direction and having a plurality of slots defined in a surface facing said feed belt, a second suction chamber positioned downstream of said main scanning line with respect to the auxiliary scanning direction and having a plurality of slots defined in a surface facing said feed belt, and a plurality of grooves by which the slots of said first suction chamber and the slots of said second suction chamber communicate with each other on a surface facing said feed belt.

7. A mechanism according to claim 6, wherein said slots are elongated in said auxiliary scanning direction, said suction box having a partition separating said first and second suction chambers from each other, said grooves being defined in said partition.

* * * * *